United States Patent [19]

Cambon

[11] Patent Number: 5,717,007
[45] Date of Patent: Feb. 10, 1998

[54] ANTI-FOULING SELF-POLISHABLE PAINTS

[75] Inventor: Christian Cambon, Sanary, France

[73] Assignee: Etat Francais as represented by the Delegue General pour l'Armement, Paris, France

[21] Appl. No.: 588,886

[22] Filed: Jan. 19, 1996

[30] Foreign Application Priority Data

Jan. 26, 1995 [FR] France .................. 95.00872

[51] Int. Cl.⁶ .................. C08L 33/10; C08K 5/17; C08K 5/18
[52] U.S. Cl. .................. 523/122; 524/248; 524/249; 524/398; 524/399; 524/520; 524/523; 524/174; 524/176; 523/177
[58] Field of Search .................. 524/398, 399, 524/248, 249, 174, 176, 520, 523; 523/122, 177

[56] References Cited

U.S. PATENT DOCUMENTS

3,623,896  11/1971  Leipold .................. 106/15

FOREIGN PATENT DOCUMENTS

| | | |
|---|---|---|
| 0051930 | 5/1982 | European Pat. Off. . |
| A-0 364 271 | 4/1990 | European Pat. Off. . |
| A-0 471 204 | 2/1992 | European Pat. Off. . |
| 0499817 | 8/1992 | European Pat. Off. .................. 523/122 |
| A-0 529 693 | 3/1993 | European Pat. Off. . |
| 2266733 | 10/1975 | France . |
| 2557585 | 7/1985 | France . |
| 2716971 | 9/1995 | France . |
| 2118196 | 10/1983 | United Kingdom . |

*Primary Examiner*—Andrew E. C. Merriam
*Attorney, Agent, or Firm*—Oliff & Berridge, P.L.C.

[57] ABSTRACT

The invention relates to anti-fouling self-polishable paints intended to be applied on an object at least partially submersed, notably on surface ships or submarine hulls, and containing standard constituents of the paints such as organic solvents, coloring pigment, wetting agents, dispersing agents or neutralizing agents.

These paints are characterized in that they comprise:

mass 5 to 60% of at least two polymers or copolymers (I) of the alkyl polyacrylates or alkyl polymethacrylate family comprising carboxylic functions, having molecular weights ranging from 15,000 to 100,000 g.mol$^{-1}$, each polymer having a very different acid index, mass 0.1 to 50% of at least one polyaminated compound (II) reacting to polymers (I), mass 0.1 to 60% of at least one organometallic compound derived from zinc, iron, manganese or cobalt, with a biocide character (III).

mass 0 to 30% of powdered hydrophobe polymers (IV).

15 Claims, 1 Drawing Sheet

ANTI-FOULING SELF-POLISHABLE PAINTS

FIELD OF THE INVENTION

The present invention relates to self-polishable paints intended to prevent the proliferation of sea micro-organisms, by application on an object at least partially submersed, notably on underwater hulls of surface ships or submarines.

BACKGROUND OF THE INVENTION

The paints which prevent the proliferation of marine micro-organisms are called anti-fouling paints later in the text.

The growth of sea organisms on the submersed parts of the ship hulls increase the resistance of the hull to forward movement, resulting in an over-consumption of fuel and disturbances of the submarine acoustic discretion. This problem has been solved by applying anti-fouling paints on the hulls comprising biocide agents which destroy the micro-organisms. These agents are released in the sea by diffusion from the paint film. The anti-fouling paints thus delay marine growth on the hull for significant periods.

However, these paints become increasingly rough by being progressively corroded, and this increases fuel consumption, reduces the navigation performance and increases the hydrodynamic noise emitted by the submersed structure. This new difficulty has been solved by using self-polishable anti-fouling paints. In addition to possessing biocide agents, these paints, under the action of the surface hydrolysis by sea water and that of the erosion due to ship movement, present a regular and controlled loss of thickness depending on the weather. The slow erosion of the film in contact with sea water constantly redresses the surface with biocide agents and, above all produces a surface with a controlled roughness.

Unfortunately, nearly all those types of paints contain tin-based polymers (documents FR2266733, FR2557585, EP0051930, GB2118196), notably copolymers of tributyltin acrylate. These components have proved to be very polluting. Their negative aspect on the environment due to an intensive utilisation, currently leads the manufacturers to reformulate all their anti-fouling paints. The recent French legislation has forbidden the use of tin-based self-polishable paints on underwater hulls less than 25 m long. This prohibition should extend to the other types of ships.

In some countries where the legislation is more draconian (U.S.A., Scandinavia, etc . . . ) conventional anti-fouling paints or even self-polishable anti-fouling paints free of organotin compound copolymers appeared on the market. Such paints are practically always formulated with a massive proportion (up to 80% of the dry film in weight) of cuprous oxide (EP0051930, FR2557585); the principal binder having a special polymer base generally of the acrylic type. These alternatives bring therefore no lasting solution to protect the environment from the significant rejection of heavy ions, notably those of copper following the intensive application of tin-free paints which are rich in copper (under the form of cuprous oxide $CU_2O$).

SUMMARY OF THE INVENTION

The invention is intended to propose anti-fouling paints of the self-polishable type which do not contain prohibited binders and whose biocide property is not due to copper derivatives.

So, the object of the present invention is anti-fouling self-polishable paints intended to be applied on an object at least partially submersed, notably on the hulls of the surface ships or submarines, and containing standard paint constituents such as organic solvents, coloured pigments, wetting agents, dispersing agents or neutralising agents, the said paints being characterised in that they comprise:

mass 5 to 60% of at least two polymers or copolymers (I) of the alkyl polyacrylates or alkyl polymethacrylate family comprising carboxylic functions, having molecular weights between 15,000 and 100,000 g. $mol^{-1}$, each polymer having a very different acid index, mass 0.1 to 50% of at least one polyaminated compound (II) reacting to polymers (I), mass 0.1 to 60% of at least one organometallic compound derived from zinc, iron, manganese or cobalt, with a biocide character (III), mass 0.1 to 30% of powdered hydrophobe polymers (IV).

The paints of the present invention can also be characterized in that they can comprise:

mass 10 to 90% of at least two polymers or copolymers (I) of an alkyl polyacrylate or alkyl polymethacrylate family, having molecular weights ranging from 15,000 to 100,000 g.$mol^{-1}$, each polymer of the at least two polymers or copolymers (I) comprising carboxylic functions and having a very different acid index;

mass 1 to 50% of at least one polyaminated compound (II), the compound (II) being in a form reacted with the at least two polymers or copolymers (I);

mass 1 to 60% of at least one organometallic compound (III) comprising at least one of zinc, iron, manganese or cobalt, the organometallic compound (III) having a biocide character; and mass 0 to 20% of powdered hydrophobe polymers (IV).

Preferably, the acid index of one of the copolymers (I) is high ( higher than 50), the other copolymer has a medium or low acid index (between 2 and 50) and the possible third polymer has a very low acid index, indeed nil (between 0 and 2). These polymer relative proportions vary depending on the type of result required and the considered application.

Preferably, the acrylic or methacrylic ester alkyl has a carbon number comprised between 1 and 4.

Preferably, again, these alkyls are linear.

The polyaminated compound(s) which modify the polymers (III) are preferably non volatile polyaminated derivatives (boiling temperature higher than 100° C.). Preferably, they are either amino-phenolic derivatives, or cycloaliphatic derivatives, hydroxylated or not. These compounds might react chemically at ambient temperature with the carboxylic acids of the acrylic or methacrylic polymers (I), generating a new polymer by partial or total cross linkage and/or by esterification between the hydroxyl functions and carboxylic acid groups of the polyacrylates.

Preferably, the polyamine is a primary, secondary or tertiary diamine, or triamine. Triamines are preferred since they allow a cross linkage in space.

Preferably, among the tertiary triamines, the ones having a phenolic hydroxyl function of the (A) type or a hydroxyl cycloaliphatic function of the (B) type below are chosen. The Tri-(DimethylaminoMethyl)-2, 4, 6-Phenol, abbreviated in TDMAMP 2, 4, 6 is preferred among the (A) type molecules.

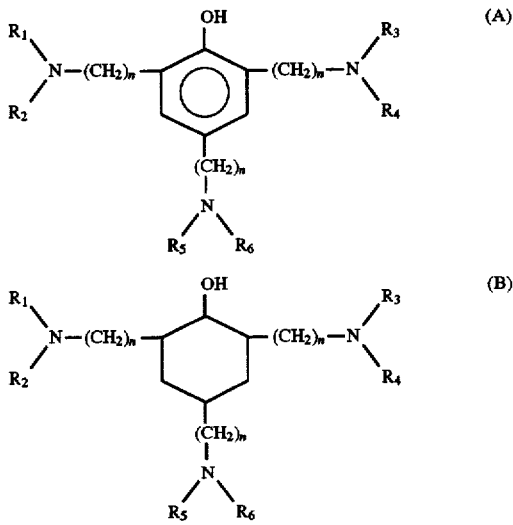

The product(s) with a biocide character (III) comprise(s) no copper, tin or heavy metals such as lead, mercury and other toxic metals. They are made of one or more metal derivatives already largely present in the sea environment, easily degradable in ultimate by-products without danger for man or the submarine environment.

The following can be particularly mentioned:
manganese ethylene-bis (dithiocarbamate) or mannebe,
zinc ethylene-bis (dithiocarbamate) or zinebe,
zinc dimethyl dithiocarbamate or zirame,
Zinc-2 pyridinethiol N-oxide or zinc pyrithione,
Manganese-2 pyridimethiol N-oxide or manganese pyrithione,
Iron-2 pyridinethiol N-oxide or iron pyrithione,
alkyl-isothiazolone halogenated derivatives, etc . . . .

The hydrophobe polymers in powder (IV) are insoluble in the paint solvent medium and not miscible with the main binder (I) and (II). They contribute to the regulation of the dry film erosion and bring them a complementary hydrophoby.

These polymers are preferably presented under the form of powder with a granulometry of a few microns and they can be made of a polyolefin powder, halogenated or not, for instance a polyethylene or polyfluoroethylene powder.

The acrylic or methacrylic polymer(s) or copolymer(s) (I), are previously put in solution using an adequate organic solvent (preferably mixtures of oxygenated solvents such as ketones, alcohols, ethers . . . ). The other compounds except for the aminated modifying reactive are then incorporated, dispersed and ground according to the standard processes of paint manufacture. At this stage an initial composition is obtained which is later put in the presence of the aminated modifying product(s) (II). At ambient temperature, the latter will react with the polymer (I) acid groups to generate new polymers with a higher molecular weight. The chemical reactions can be partial cross linkage or esterification reactions, between the more reactive functional groups of (I) and (II). This operation is accompanied by a marked increase in the preparation viscosity.

It is interesting to note that, in addition to the ecological advantages (absence of tin and copper), these paints can have various colours, among which white, due to the absence of copper oxide. Of course, they improve the usual advantages of the anti-fouling self-polishable paints, i.e.:
possibility to modulate on demand the erosion rate by adapting the respective proportions of the compounds (I), (II) and (IV),
long lasting anti-fouling efficiency,
possibility to apply them on the standard anti-corrosion ground,
manufacture according to the traditional paint processes and materials.

DESCRIPTION OF THE PREFERRED EMBODIMENT

Figure 1:
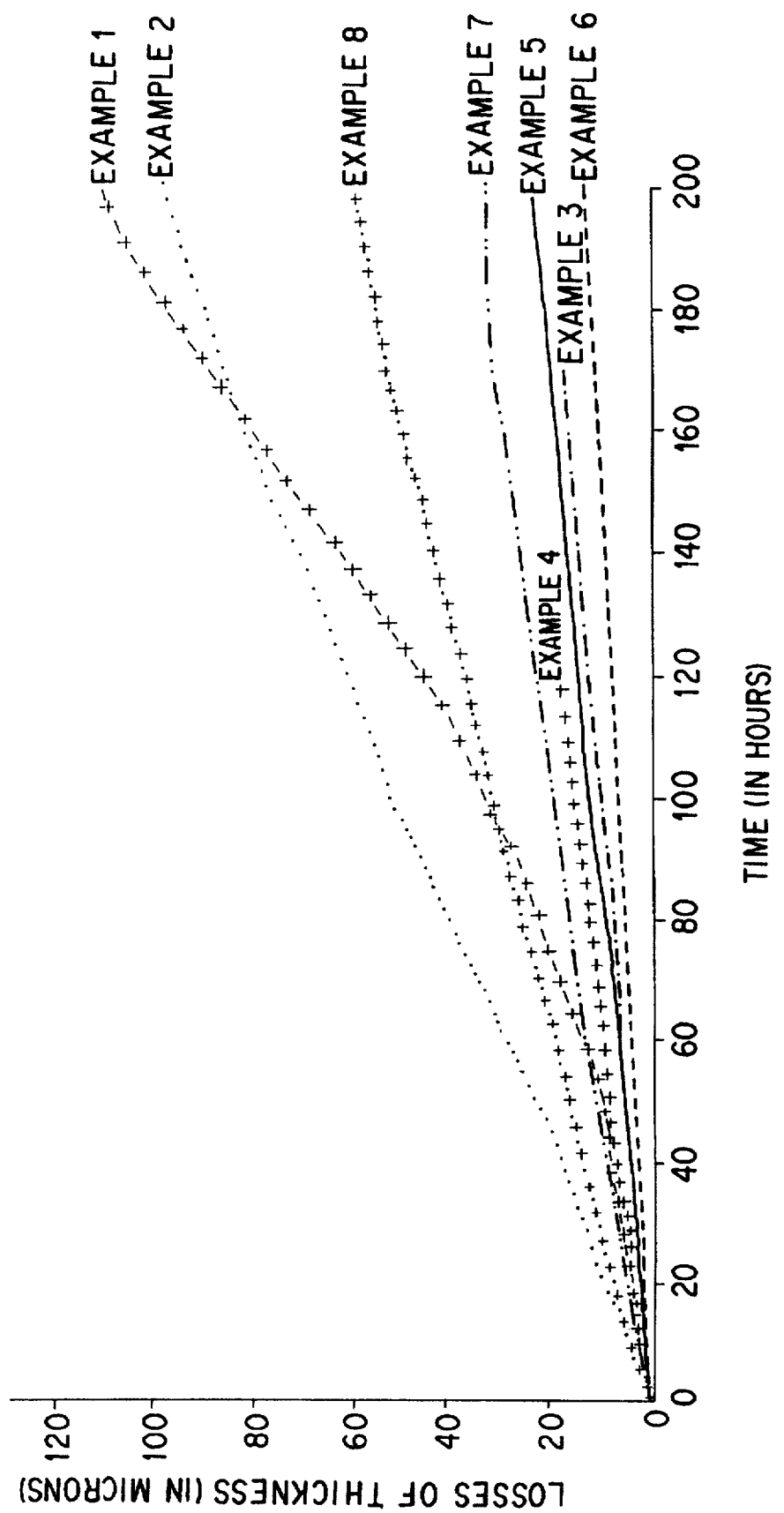
FIG. 1 is a graph comparing the erosion speed of self-polishable paints of the invention compared wit standard self-polishable paints.

In order to better illustrate the object of the present invention, some examples are described hereunder relating to paints for ships.

In examples 1 to 5, the copolymer called 55/5 is a copolymer of the methyl and n-butyl methacrylate copolymer family with an acid index equal to 5 and whose molecular weight ranges from 50,000 to 60,000 $g.mol^{-1}$. The copolymer 60/124 is a copolymer of the methyl and n-butyl methacrylate copolymer family with an acid index equal to 124 and a molecular weight ranging from 40,000 to 60,000 $g.mol^{-1}$.

The formulations of examples 1 to 5 are compared to the standard formulations based on organotin compounds (examples 6 to 8).

The BYK ANTITEKKA U and BYKP104S compounds are additives for paints supplied by BYK CHIMIE company.

CUTINOX 1120 and CUTINOX 1000 copolymers are marketed by ACIMA company, BIOMET 304 copolymer is marketed by M and T CHEMICALS. They are all tributyltin acrylate copolymers, with a dry extract of 60%.

EXAMPLES

Example 1

Previously an initial composition is prepared by mixing the following products:

| Constituent | Part in weight |
| --- | --- |
| Copolymer 55/5 | 14.81% |
| Copolymer 60/124 | 6.48% |
| Mixture of oxygenated solvents | 46.20% |

The dissolution is made under rapid shaking out until obtaining an homogenous varnish, then the following products are incorporated in this varnish:

| Constituents | Function | Parts in weight |
| --- | --- | --- |
| Powdered zinc pyrithione | biocide agent | 22.22% |
| Powdered fluorinated polyolefin | hydrophobe polymer | 1.48% |
| Rutile type titanium dioxide | colouring pigment | 2.96% |
| Triethylamine | neutralising agent | 0.65% |
| BYK ANTITERRA U | anti sedimentation wetting agent | 1.48% |
| Triarylphosphate | plastifying agent | 2.96% |

The flowing on is carried out and then the grinding is done with a microball grinder (standard process of paint fabrication). Finally the aminated reactive compound TDMAMP 2, 4, 6 is incorporated into the paint by several minutes of strong shaking at ambient temperature.

| Constituents | Function | Parts in weight |
|---|---|---|
| TDMAMP 2, 4, 6 | polymer modifier | 0.74% |

A paint according to the invention is obtained which is anti-fouling and self-polishable without copper nor tin, noted example 1.

Example 2

A paint is prepared according to the invention which is anti-fouling and self-polishable without copper nor tin, noted example 2, according to an operating mode similar to that used in example 1, by mixing the following products:

| Constituents | Function | Parts in weight |
|---|---|---|
| Copolymer 55/5 | | 14.81% |
| Copolymer 60/124 | | 6.48% |
| Mixture of oxygenated solvents | | 47.68% |
| Powdered zinc pyrithione | biocide agent | 22.22% |
| Rutile type titanium dioxide | colouring pigment | 2.96% |
| Triethylamine | neutralising agent | 0.65% |
| BYK ANTITERRA U | anti sedimentation wetting agent | 1.48% |
| Triarylphosphate | plastifying agent | 2.96% |
| TDMAMP 2, 4, 6 | polymer modifier | 0.74% |

Example 3

A paint is prepared according to the invention which is anti-fouling and self-polishable without copper nor tin, noted example 3, according to an operating mode similar to that used in example 1, by mixing the following products:

| Constituents | Function | Parts in weight |
|---|---|---|
| Copolymer 55/5 | | 10.40% |
| Copolymer 60/124 | | 5.30% |
| Mixture of oxygenated solvents | | 43.20% |
| Powdered zinc pyrithione | biocide agent | 27.00% |
| Powdered fluorated polyolefine | hydrophobe polymer | 1.50% |
| Rutile type titanium dioxide | colouring pigment | 1.90% |
| Carbon black | colouring pigment | 0.30% |
| Triethylamine | neutralising agent | 0.70% |
| BYK P 104 S | neutralising agent | 0.70% |
| Triarylphosphate | plastifying agent | 5.00% |
| TDMAMP 2, 4, 6 | polymer modifier | 4.00% |

Example 4

A paint is prepared according to the invention which is anti-fouling and self-polishable without copper nor tin, noted example 4, according to an operating mode similar to that used in example 1, by mixing the following products:

| Constituents | Function | Parts in weight |
|---|---|---|
| Copolymer 55/5 | | 10.50% |
| Copolymer 60/124 | | 5.40% |
| Mixture of oxygenated solvents | | 43.60% |
| Powdered zinc pyrithione | biocide agent | 27.40% |
| Powdered fluorated polyolefine | hydrophobe polymer | 1.50% |
| Carbon black | colouring pigment | 1.10% |
| BYK P 104 S | wetting agent | 0.70% |

-continued

| Constituents | Function | Parts in weight |
|---|---|---|
| Triarylphosphate | plastifying agent | 5.10% |
| TDMAMP 2, 4, 6 | polymer modifier | 4.70% |

Example 5

A paint is prepared according to the invention which is anti-fouling and self-polishable without copper nor tin, noted example 5, according to an operating mode similar to that used in example 1, by mixing the following products:

| Constituents | Function | Parts in weight |
|---|---|---|
| Copolymer 55/5 | | 10.40% |
| Copolymer 60/124 | | 5.30% |
| Mixture of oxygenated solvents | | 43.10% |
| Powdered zinc pyrithione | biocide agent | 27.00% |
| Powdered fluorated polyolefine | hydrophobe polymer | 1.50% |
| Rutile type titanium dioxide | colouring pigment | 1.90% |
| Carbon black | colouring pigment | 0.30% |
| Triethylamine | neutralising agent | 0.70% |
| BYK P 104 S | wetting agent | 0.70% |
| Triarylphosphate | plastifying agent | 5.10% |
| TDMAMP 2, 4, 6 | polymer modifier | 4.00% |

Example 6

A standard paint is prepared by mixing the following matters:

| Constituents | Parts in weight |
|---|---|
| CUTINOX 1120 or BIOMET 304 copolymer | 31% |
| Soja lecithin | 0.3% |
| Hydrogenated castor oil | 0.9% |
| Viscosity stabiliser | 1.8% |
| Zinc oxide | 10.7% |
| Cuprous oxide | 38.1% |
| Rutile type titanium dioxide | 1.0% |
| Naphta solvent 90/160 | 6% |
| Xylene | 10.2% |

A paint is obtained noted standard 1.

Example 7

A second standard paint is prepared by mixing the following matters:

| Constituents | Parts in weight |
|---|---|
| CUTINOX 1000 copolymer | 40.8% |
| Soja lecithin | 0.3% |
| Hydrogenated castor oil | 0.6% |
| Zinc oxide | 10% |
| Synthetic black iron oxide | 24% |
| Carbon black | 2.4% |
| Algicide | 7% |
| Naphta solvent 90/160 | 11.5% |
| Toluene | 3.4% |

A paint is obtained which is noted standard 2.

Example 8

A third standard paint is prepared by mixing the following matters:

| Constituents | Parts in weight |
| --- | --- |
| CUTINOX 1120 or BIOMET 304 | 40.8% |
| Soja lecithin | 0.3% |
| Hydrogenated castor oil | 0.6% |
| Zinc oxide | 10% |
| Synthetic black iron oxide | 24% |
| Carbon black | 2.4% |
| Algicide | 7% |
| Naphta solvent 90/160 | 11.5% |
| Toluene | 3.4% |

A paint is thus obtained which is noted standard 3, different from standard paint 1 due to its speed of erosion.

Evaluation tests have been made on these paints. These tests relate to biocide efficiency on the one hand and to erodability on the other hand.

The tests of biocide efficiency are carried out over a long period: painted test pieces are immersed in natural sea water for a minimum of one to three years or more. These tests are made on rafts equipped with standardised raft carrier chassis. Paints according to the invention (paints of example 1 type) have been currently immersed for two years without a significative occurrence of sea fouling.

The paint erosion accelerated tests are intended to reproduce, with a significant factor of acceleration, the erosion of the paint films in operation on a ship underwater. These tests are carried out by means of a device which includes a rotating cylinder coated with test paints, equipped with a turbine which strongly accelerates the phenomena of surface erosion due to a powerful and regular hydrodynamic flux. This device is described for example in patent application FR 2716971 in the name of the French State.

The curves represented in FIG. 1 and obtained by means of the device described in the here above application, make it possible to visualise the comparison of the erosion speed of the various self-polishable paints according to the invention (examples 1 to 5) and self-polishable paints (examples 6 to 8).

The formulations, according to examples 1 and 2 are of the rapid erosion type, the ones according to examples 3 to 5 have erosion speeds which can be compared to that of the standards for surface ships and submarines. So, depending on the conditions of use, different erosion speeds of the paints according to the invention can be chosen.

I claim:

1. Anti-fouling self-polishable paints intended to be applied on an object at least partially submersed, comprising at least one of organic solvents, colouring pigment, wetting agents, dispersing agents and neutralising agents, the paints further comprising:

mass 5 to 60% of at least two polymers (I) of an alkyl polyacrylate or alkyl polymethacrylate family, each of the at least two polymers (I) comprising carboxylic functions and having a very different acid index;

mass 0.1 to 50% of at least one polyaminated compound (II), the compound (II) being chemically linked with the at least two polymers (I);

mass 0.1 to 60% of at least one organometallic compound (III) comprising at least one of zinc, iron, manganese or cobalt, the organometallic compound (III) having a biocide character; and mass 0 to 30% of powdered hydrophobe polymers (IV).

2. Anti-fouling self-polishable paints according to claim 1, wherein a first polyacrylate or polymethacrylate of the at least two polymers (I) has an acid index higher than 50, and a second polyacrylate or polymethacrylate of the at least two polymers (I) has an acid index ranging from 2 to 50.

3. Anti-fouling self-polishable paints according to claim 1, wherein an ester function of the at least two polymers (I) has a carbon number of between 1 and 4.

4. Anti-fouling self-polishable paints according to claim 3, wherein the ester function of the at least two polymers (I) is a linear alkyl.

5. Anti-fouling self-polishable paints according to claim 1, wherein the compound (II) has a boiling temperature higher than 100° C.

6. Anti-fouling self-polishable paints according to claim 1, wherein the compound (II) has a chemical structure of the following type:

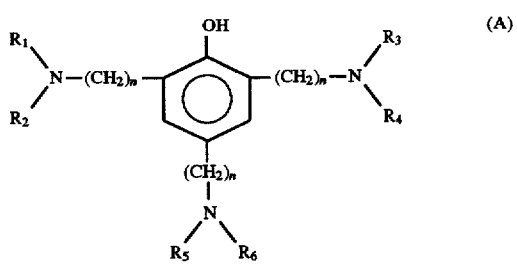

where R1 to R6 are alkyls and n is a positive whole number.

7. Anti-fouling self-polishable paints according to claim 6, wherein the compound (II) is Tri-(DiMethylaminoMethyl)-2, 4, 6-phenol, R1 to R6 are methyl groups and n 1.

8. Anti-fouling self-polishable paints according to claim 1, wherein the compound (II) has a cycloaliphatic chemical structure of the following type:

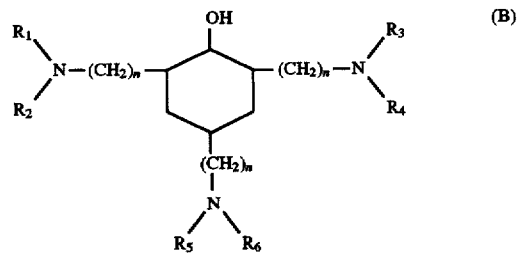

where R1 to R6 are alkyls and n is a positive whole number.

9. Anti-fouling self-polishable paints according to claim 1, wherein the hydrophobe polymers are fluorated polyolefines.

10. Anti-fouling self-polishable paints intended to be applied on an object at least partially submersed, comprising at least one of organic solvents, colouring pigments, wetting agents, dispersing agents and neutralising agents, the paints being in a form of dry film after application on a surface and further comprising:

mass 10 to 90% of at least two polymers (I) of an alkyl polyacrylate or alkyl polymethacrylate family, each polymer of the at least two polymers (I) comprising carboxylic functions and having a very different acid index;

mass 1 to 50% of at least one polyaminated compound (II), the compound (II) being chemically linked with the at least two polymers (I);

mass 1 to 60% of at least one organometallic compound (III) comprising at least one of zinc, iron, manganese or cobalt, the organometallic compound (III) having a biocide character; and mass 0 to 20% of powdered hydrophobe polymers (IV).

11. Anti-fouling self-polishable paints according to claim 2, wherein a third polyacrylate or polymethacrylate of the at least two polymers (I) has an acid index ranging from 0 to 2.

12. Anti-fouling self-polishable paints according to claim 6, wherein at least one of R1 to R6 is methyl.

13. Anti-fouling self-polishable paints according to claim 6, wherein at least one of R1 to R6 is ethyl.

14. Anti-fouling self-polishable paints according to claim 8, wherein at least one of R1 to R6 is methyl.

15. Anti-fouling self-polishable paints according to claim 8, wherein at least one of R1 to R6 is ethyl.

* * * * *